(12) United States Patent
Arnott et al.

(10) Patent No.: US 12,034,676 B2
(45) Date of Patent: *Jul. 9, 2024

(54) RESOURCE ALLOCATION

(71) Applicant: NEC Corporation, Tokyo (JP)

(72) Inventors: Robert Arnott, London (GB); Diptendu Mitra, Singapore (SG)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,700

(22) Filed: Apr. 26, 2023

(65) Prior Publication Data

US 2023/0269058 A1 Aug. 24, 2023

Related U.S. Application Data

(63) Continuation of application No. 17/190,848, filed on Mar. 3, 2021, now Pat. No. 11,671,230, which is a
(Continued)

(30) Foreign Application Priority Data

Mar. 20, 2006 (GB) ...................................... 0605581

(51) Int. Cl.
*H04L 5/00* (2006.01)
*H04W 72/04* (2023.01)
(Continued)

(52) U.S. Cl.
CPC .......... *H04L 5/0094* (2013.01); *H04W 72/04* (2013.01); *H04W 72/0446* (2013.01); *H04W 72/23* (2023.01)

(58) Field of Classification Search
None
See application file for complete search history.

(56) References Cited

U.S. PATENT DOCUMENTS 6,333,936 B1 12/2001 Johansson et al.
6,493,331 B1 12/2002 Walton et al.
(Continued)

FOREIGN PATENT DOCUMENTS

AU 2155451 C2 8/2000
CA 2794609 A1 10/2007
(Continued)

OTHER PUBLICATIONS

3GPP TSG RAN WG1#42bis, R1-051049, "Downlink Resource Allocation for E-UTRA", San Diego, USA. Oct. 10, 2005- Oct. 14, 2005 http://www.3aPD.ora/ftp/tsa ranAA/G1 RLI/TSGR1 42bis/Docs/R 1-051049.zip, pp. 1-4.
(Continued)

*Primary Examiner* — Jutai Kao

(57) ABSTRACT

A method of signaling resource allocation data in a communication system which uses a plurality of sub-carriers arranged in a sequence of chunks. An allocation of the sub-carriers for each of a plurality of user devices is received. The received allocations are processed to determine, for each user device, data identifying a start chunk and an end chunk within the sequence of chunks, which depend upon the sub-carriers allocated to the user device. Different resource allocation data is generated for each of the user devices using a predetermined mapping which relates the data identifying the corresponding start chunk and end chunk determined by the processing step to resource allocation data comprising a unique value. The respective resource allocation data is signaled to each of the plurality of user devices.

20 Claims, 12 Drawing Sheets

Related U.S. Application Data continuation of application No. 16/444,058, filed on Jun. 18, 2019, now Pat. No. 10,958,406, which is a continuation of application No. 15/475,358, filed on Mar. 31, 2017, now Pat. No. 10,355,848, which is a continuation of application No. 15/064,784, filed on Mar. 9, 2016, now Pat. No. 9,661,630, which is a continuation of application No. 13/137,991, filed on Sep. 23, 2011, now Pat. No. 9,319,206, which is a continuation of application No. 12/225,236, filed as application No. PCT/JP2007/056524 on Mar. 20, 2007, now Pat. No. 8,310,998.

(51) Int. Cl.
*H04W 72/0446* (2023.01)
*H04W 72/23* (2023.01)

(56) References Cited

U.S. PATENT DOCUMENTS

| | | | |
|---|---|---|---|
| 7,596,114 | B2 | 9/2009 | Park et al. |
| 7,639,663 | B1 | 12/2009 | Nerses et al. |
| 7,839,822 | B2 | 11/2010 | Yang et al. |
| 8,310,998 | B2 | 11/2012 | Arnott et al. |
| 9,319,206 | B2 | 4/2016 | Arnott et al. |
| 9,661,630 | B2 | 5/2017 | Arnott et al. |
| 10,355,848 | B2 * | 7/2019 | Arnott ............... H04W 72/23 |
| 10,958,406 | B2 * | 3/2021 | Arnott ............... H04W 72/0446 |
| 11,671,230 | B2 * | 6/2023 | Arnott ............... H04W 72/04 370/329 |
| 2001/0007574 | A1 | 7/2001 | Liu et al. |
| 2002/0031189 | A1 | 3/2002 | Hiben et al. |
| 2002/0105970 | A1 | 8/2002 | Shvodian |
| 2003/0219028 | A1 | 11/2003 | Peyravian et al. |
| 2004/0258134 | A1 | 12/2004 | Cho et al. |
| 2005/0013279 | A1 | 1/2005 | Hwang et al. |
| 2005/0094597 | A1 | 5/2005 | Hwang et al. |
| 2005/0128993 | A1 | 6/2005 | Yu et al. |
| 2005/0232181 | A1 | 10/2005 | Park et al. |
| 2006/0050664 | A1 | 3/2006 | Guey |
| 2007/0009054 | A1 | 1/2007 | Kwak et al. |
| 2007/0064669 | A1 | 3/2007 | Classon et al. |
| 2007/0140102 | A1 | 6/2007 | Oh et al. |
| 2007/0165568 | A1 | 7/2007 | Damnjanovic et al. |
| 2007/0201398 | A1 | 8/2007 | Yang et al. |
| 2007/0211668 | A1 | 9/2007 | Agrawal et al. |
| 2007/0217406 | A1 | 9/2007 | Riedel et al. |
| 2009/0129362 | A1 | 5/2009 | Higuchi |
| 2009/0232084 | A1 | 9/2009 | Li et al. |
| 2009/0303938 | A1 | 12/2009 | Kim et al. |
| 2011/0170446 | A1 | 7/2011 | Li et al. |
| 2015/0365927 | A1 | 12/2015 | Stanwood et al. |

FOREIGN PATENT DOCUMENTS

| | | |
|---|---|---|
| CN | 1585394 A | 2/2005 |
| EP | 1519522 A2 | 3/2005 |
| EP | 1534039 | 5/2005 |
| EP | 1549093 A2 | 6/2005 |
| EP | 1997260 B1 | 7/2013 |
| EP | 2466781 B1 | 7/2013 |
| EP | 2627029 B1 | 8/2014 |
| EP | 1867084 B1 | 11/2017 |
| GN | 1625164 A | 6/2005 |
| JP | H08-331562 A | 12/1996 |
| JP | 2004-53787 A | 2/2004 |
| JP | 2004-537875 A | 12/2004 |
| JP | 2005-005781 A | 1/2005 |
| JP | 2005-244958 A | 9/2005 |
| JP | 2006-245883 A | 9/2005 |
| JP | 2007-288754 A | 11/2007 |
| JP | 2008-546303 A | 12/2008 |
| KR | 2005-0009583 A | 1/2005 |
| KR | 20050041801 A | 5/2005 |
| RU | 2264036 C2 | 10/2004 |
| RU | 2005107717 4 | 11/2005 |
| WO | 99/56475 A1 | 11/1999 |
| WO | 02/49306 A2 | 6/2002 |
| WO | 2005/041495 A1 | 5/2005 |
| WO | 2005/064875 | 7/2005 |
| WO | 2006/011524 | 2/2006 |
| WO | 2006/137708 A1 | 12/2006 |

OTHER PUBLICATIONS

Chinese Office Action dated May 29, 2013 with English translation.
Chinese Search report dated Jan. 31, 2011.
Communication dated Jan. 24, 2017, from the Russian Patent Office in counterpart application No. 2016100338/07.
Communication dated Jan. 25, 2016 from the Canadian Intellectual Property Office issued in corresponding Application No. 2,794,609.
Communication dated Nov. 20, 2014, issued by the Canadian Intellectual Property Office in counterpart Application No. 2646183.
Communication dated Oct. 21, 2014, issued by the U.S. Patent and Trademark Office in corresponding U.S. Appl. No. 13/137,991.
Co-pending application, U.S. Appl. No. 13/137,992, Arnott et al., Oct. 2, 2013.
Co-pending application, U.S. Appl. No. 13/137,996, Arnott et al., Oct. 2, 2013.
Ericsson, E-Ultra DL-Localized and Distributed Transmission, 3GPP TSG-RAN WG1 LTE Ad Hoc, R1-060095, Jan. 25, 2006, URL:http:www.3ap.ora/ftp/tsq ran/WG1 TSGR1 AH/LTEAH January-06/Docs/RI-060095.zip pp. 1-3.
United States Office Action dated Dec. 17, 2012 in U.S. Appl. No. 13/137,996.
United States Office Action dated Dec. 18, 2012 in U.S. Appl. No. 13/137,992.
TSG-RAN WG1 Meeting #44, R1-060601, "Scalable Band Width & Physical Channel Mapping for L1/L2 Control Channel", Denver, USA, Feb. 13-17, 2006. http://www.3aDP.ora/ftp/tsa ran/WG1 -RL1/TSGR1 44/Pocs/RI-060601.zip, pp. 1-6.
TSG-RAN WG1 #44, R1-060573, "E-Ultra Downlink Control Signaling-Overhead Assessment", Denver, CO, USA, Feb. 13-17, 2006, http://www.3app.ora/ftp.tsq ran/WG1 RL1/TSGR1 44/Docs/R1 -060573.zip.
Russian Patent Office issued a Decision on Grant on Oct. 8, 2013 with English translation.
Russian Office Action dated Dec. 16, 2010, with English translation.
PCT/IB/326.
PCTAB/373.
PCT/ISA/237.
Office Action dated Nov. 23, 2011 (U.S. Appl. No. 12/255,236).
Office Action Issued Apr. 30, 2019 in Brazilian Application No. PI0707071-3.
Office Action (Patent Examination Report) dated Aug. 20, 2015, issued by the Australian Patent Office in counterpart Australian Application No. 2014202917.
NTT DoCoMo, Ericsson, Fujitsu, Mitsubishi Electric, Distributed FDMA Transmission for Shared Data Channel in E-Ultra. TSG-RAN, WG1#144, R1-060305, URL: http:/www.3gpp.org/ftp/tsg_ran/WG1_RL1/TSGR1_44/Docs/R1-060305.zip Feb. 17, 2006, pp. 1-16.
Examination Search Report dated May 29, 2012 in Application No. 070739962.4.
Extended European Search Report dated May 31, 2012 in Application No. 12159956.7.
Japanese Office Action dated Jun. 11, 2013 with a partial English translation B.
Japanese Office Action dated Jun. 11, 2013, with a partial English translation A.
United States Office Action dated Nov. 22, 2013 in U.S. Appl. No. 13/137,992.
United States Office Action dated Nov. 5, 2013, in U.S. Appl. No. 13/540,730.
United States Office Action dated Nov. 19, 2013 in U.S. Appl. No. 13/137,996.

(56) References Cited

OTHER PUBLICATIONS

United States Office Action dated Jul. 12, 2013 in U.S. Appl. No. 13/137,992 .
United States Office Action dated Jul. 15, 2013 in U.S. Appl. No. 13/137,996.
Japanese Office Action dated Jun. 12, 2012 with partial English translation in Application No. JP 2011-060584.
Japanese Office Action dated Nov. 12, 2013 with a partial English translation.
Russian Patent Office issued a Decision on Grant on Nov. 11, 2013 with English translation.
Motorola, Resource Allocation Mapping Rules and TP, 3GPP TSG-RAN WG#44, R1-060400, URLd: http://Vww.3aDP.orQ/ftp/tsp ran/WG1 RL.1/TSGR1 44/Docs/RI -060400.zip Feb. 17, 2006 pp. 1-4.
United States Office Action dated Jul. 25, 2014 in U.S. Appl. No. 13/540,730.
Communication dated Sep. 21, 2016 from the United States Patent and Trademark Office in U.S. Appl. No. 15/064,784.
Japanese Office Action dated Sep. 4, 2012 with a partial English translation in Application No. JP2011-060584.
3GPP TSG 25.212 version 6.3.0 Release 6, "Universal Mobile Telecommunications System: Multiplexing and Channel Coding", Europe Telecommunications Standard Institute, 2004, https://www.etsi.org/deliver/etsi_ts/125200_125299/125212/06 03.00_60/ts_125212v060300p.pdf.
3GPP TSG 25.213 version 6.4.0 Release 5, "Universal Mobile Telecommunications System: Spreading and Modulation", Europe Telecommunications Standard Institute, 2005, https://www.etsi.org/deliver/etsi_ts/125200_125299/125213/06.04.00_60/ts_125213v060400p.pdf.
Ericsson, NTT DeCoMo Downlinking Scheduling Information, R1-060573, Feb. 13-17, 2006, URL:https://www.3gpp.org/ftp/tsg_ran/WG1_RL1/TSGR1_44/Docs/R1-060573.zip.
3GPP TSG RAN WG1#43bis, R1-051417, "Downlink Scheduling for OFDMA", San Diego. USA, Nov. 7-11, 2005, https://www.3gpp.org/ftp/tsg_ran/WG1_RL1/TSGR1_43/Docs/R1-051417.zip.
3GPP TSG RAN WG1 LTE Ad-Hoc, R1-060215. "Downlink Scheduling", USA, Jan. 23-25, 2006, https://www.3gpp.org/ftp/tsg_ran/wg1_rL1/TSGR1_AH/LTE_AH_0601/Docs/R1-060215.zip.
3GPP TSG RAN WG1 LTE 43, R1-060475, "Uplink Scheduling", USA, Feb. 23-25, 2006, https://www.3gpp.org/ftp/tsg_ran/WG1_RL1/TSGR1_44/Docs/R1-060475.zip.
Samsung, "Downlink Channelization and Multiplexing for EUTRA", R1-060604, Jun. 20-21, 2005, France, pp. 1-9.
LG Electronics, "Downlink resource allocation in EUTRA", R1-060052, Jan. 23-25, 2006, Finland.
Ericsson, "E-UTRA DL—Localized and distributed transmission, text proposal", R1-060096, Jan. 23-25, 2006, Finland.
Motorola, "EUTRA SC-FDMA Uplink Resource Block, Resource Allocation and Pilot/Reference Signal Design & TP", R1-060246, Jan. 23-25, 2006, Finland, pp. 1-18.
Siemens, "TP for 25.814 on physical resource block size and allocation for DL", R1-060255, Jan. 23-25, 2006, Finland, pp. 1-2.
Yang Yang et al., "Maximally Flexible Assignment of Orthogonal Variable Spreading Factor Codes for Multirate Traffic", IEEE Transactions on Wireless Communications, vol. 3, No. 3, May 2004, pp. 871-792.
Indian Office Action for IN Application No. 201748026393 mailed on Sep. 20, 2021.

* cited by examiner

Localised Chunk Allocation

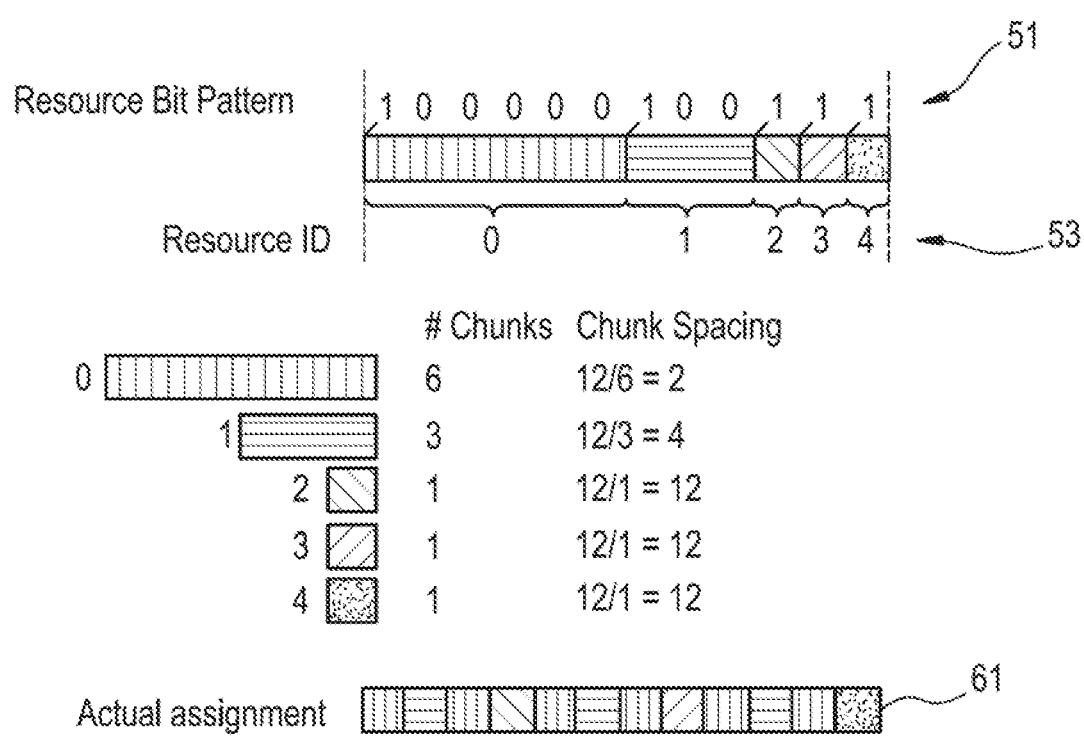

Distributed Sub-Carrier Allocation

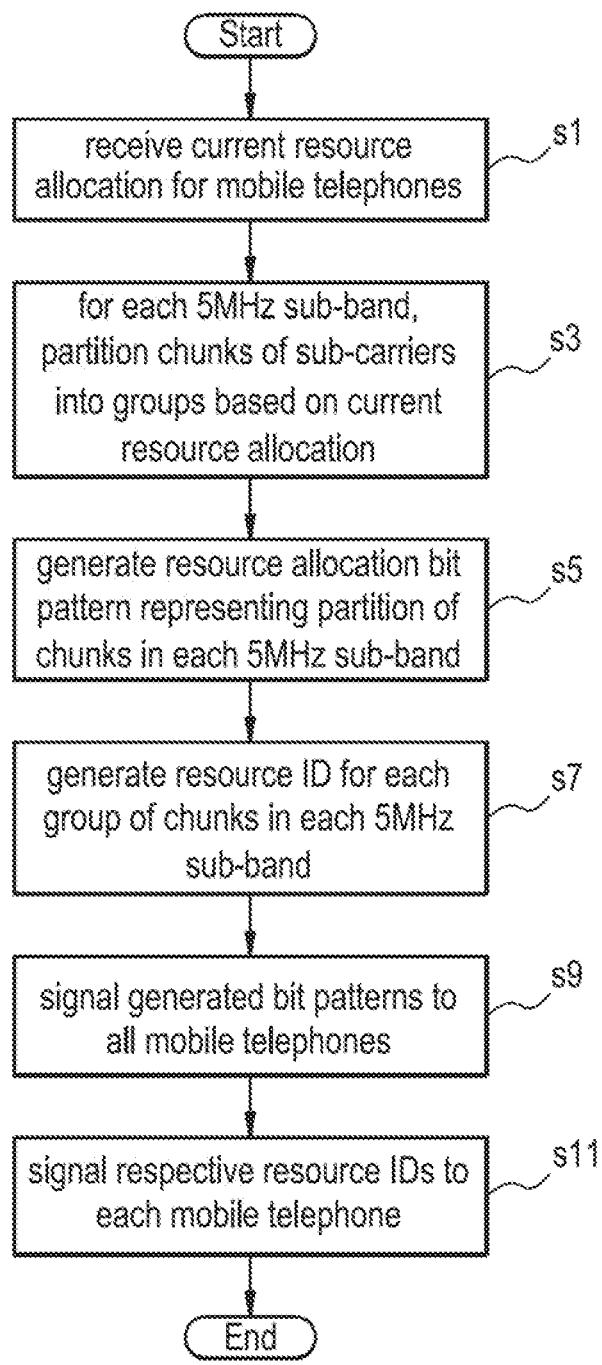

RESOURCE ALLOCATION

CROSS REFERENCE TO RELATED APPLICATIONS

The present Application is a Continuation of U.S. application Ser. No. 17/190,848, filed Mar. 3, 2021, which is a Continuation U.S. application Ser. No. 16/444,058, filed Jun. 18, 2019, now U.S. Pat. No. 10,958,406, Which is a Continuation U.S. application Ser. No. 15/475,358, filed Mar. 31, 2017, now U.S. Pat. No. 10,355,848, which is a Continuation of U.S. application Ser. No. 15/064,784, filed Mar. 9, 2016 now U.S. Pat. No. 9,661,630, which is a Continuation of U.S. application Ser. No. 13/137,991 filed Sep. 23, 2011, now U.S. Pat. No. 9,319,206, which Continuation of U.S. application Ser. No. 12/225,236, filed Sep. 17, 2008, now U.S. Pat. No. 8,310,998 which is the national stage of International Application No. PCT/JP2007/056524, filed Mar. 20, 2007, which claims priority to Great Britain Application No. 0605581.8, having filing date of Mar. 20, 2006, all of which are incorporated herein by reference.

DESCRIPTION

Field of the Invention

The present invention relates to the signaling of resource allocations within a communication system. The invention has particular, although not exclusive relevance to the signaling of sub-carriers used in an orthogonal frequency divisional multiple access (OFDMA) communication system.

BACKGROUND OF THE INVENTION

OFDMA and single carrier FDMA have been selected as the downlink and uplink multiple access schemes for the E-UTRA air interface currently been studied in 3GPP (which is a standard based collaboration looking at the future evolution of third generation mobile telecommunication systems). Under the E-UTRA system, a base station which communicates with a number of user devices allocates the total amount of time/frequency resource (depending on bandwidth) among as many simultaneous users as possible, in order to enable efficient and fast link adaptation and to attain maximum multi-user diversity gain. The resource allocated to each user device is based on the instantaneous channel conditions between the user device and the base station and is informed through a control channel monitored by the user device.

SUMMARY OF THE DISCLOSURE

In order to support a large number of users devices, an efficient mechanism of resource signaling utilizing the least possible time/frequency resource is necessary.

And thus there is much desired in the art to provide a novel method for signaling resource allocation data in a communication system, communication node (or station), user devices therefore, a computer-readable program for operating the method and apparatus, devices and/or system.

According to a first aspect, the present invention provides a method of signaling resource allocation data in a communication system which uses a plurality of sub-carriers arranged in a sequence of chunks, the method comprising: receiving an allocation of the sub-carriers for each of the user devices; processing the received allocations to determine, for each user device, data identifying a start chunk and an end chunk within the sequence of chunks, which depend upon the sub-carriers allocated to the user device; generating respective resource allocation data for each of the user devices using said data identifying the corresponding start chunk and end chunk determined by the processing step; and signaling the respective resource allocation data to each of the plurality of user devices.

Each of the user devices can then determine its allocated sub-carriers by receiving the resource allocation data identifying the start chunk and end chunk within the sequence of chunks and by relating this data to the sub-carrier allocation using information held or defined within the user device.

In one mode, the resource allocation data includes a bit pattern which defines a grouping of the sequence of chunks into a sequence of groups in dependence upon the sub-carriers allocated to the user devices together with a resource which identifies the group of chunks allocated to that user device. In this case the resource ID preferably depends on the position of the group within the sequence of groups.

In an alternative mode, the resource allocation data comprises a unique value, related to the combination of the start chunk and end chunk of an allocated group of chunks. For some allocations, the group of chunks may comprise a single chunk, in which case the start chunk and end chunk will be the same. The data identifying the start and end chunk may identify these chunks either directly or indirectly. For example, the data identifying these chunks may identify the start chunk or the end chunk and the number of chunks between the start chunk and end chunk.

In a preferred mode, a number of different types of sub-carrier allocations can be made. In this case, the processing performed in the encoder and the processing performed the decoder will depend on the allocation type that is used and data identifying the allocation type will also have to be signaled to the user devices, so that they can perform the appropriate processing of the received resource allocation data.

For resource allocation, efficient encoding techniques are necessary for encoding resource allocation data to be signaled to a number of user devices in a communication system. In one encoding technique, a resource allocation bit pattern is transmitted to all the users together with a resource ID for each user. Each user then identifies its allocated sub-carriers using the received allocation bit pattern and the received resource ID. In another encoding technique, a code tree is used to generate a value representing the sub-carrier allocation. The user device then uses the code tree to determine the sub-carrier allocation from the signaled value.

The generating step may include: generating a bit pattern which defines a grouping of the sequence of chunks into a sequence of groups, in dependence upon the sub-carriers allocated to each user device; generating a resource ID for each group in dependence upon the position of the group within the sequence of groups; and wherein the allocation data for a user device comprises the bit pattern and a respective resource ID.

The signaling step may signal the bit pattern in a signaling channel common to the user devices.

The signaling step may signal the resource ID for a user device in a signaling channel dedicated to that user device.

The bit pattern may include a bit associated with each of the second and subsequent chunks in the sequence of chunks, whose value defines whether or not the associated chunk is the start of a new group in the sequence of groups.

The bit pattern may comprise N−1 bits, where N is the number of chunks in the sequence of chunks.

The resource ID for a group may identify the group by its position within the sequence of groups.

The generating step may comprise using to predetermined mapping which relates the data identifying the start and end chunks for a user device to a unique value, and the resource allocation data for the user device may comprise the value.

The mapping may be defined by one or more equations.

The mapping may be defined by the following expression:

$$\text{if}(P-1) \leq \left\lceil \frac{N}{2} \right\rceil$$
$$x = N(P-1) + O$$
$$\text{else}$$
$$x = N(N-(P-1)) + (N-1-O)$$

where $\lceil \rceil$ is the ceiling function, N is the number of chunks in the sequence, O is the start chunk and P is the number of consecutive chunks.

The mapping may be defined by a data structure that defines a code tree comprising a plurality of leaf nodes and having a depth corresponding to the number of chunks in the sequence of chunks.

The mapping may be defined by a look up table.

The signaling step may signal the resource allocation data for a user device in a signaling channel that is dedicated to the user device.

The received data may identify a type of allocation of the sub-carriers, wherein the processing performed in the processing step depends on the identified type of allocation, and the generating step may generate resource allocation data that includes type data identifying the type of allocation.

One type of allocation may be a localised chunk allocation, in which a user device is allocated a set of consecutive chunks of sub-carriers.

One type of allocation tray be a distributed chunk allocation, in which a user device is allocated a set of the chunks dispersed within its supported bandwidth.

One type of allocation may be a distributed carrier allocation, in which a user device is allocated a set of possibly discontinuous sub-carriers dispersed within its supported bandwidth.

The generating step may be operable to encode an identifier of the determined start chunk and an identifier of the determined end chunk when generating the resource allocation data.

The communication system may use a plurality of sub-bands, each of which comprises sub-carriers arranged in a sequence of chunks, and the method may generate respective resource allocation data for sub-carrier allocation in each sub-band.

The resource allocation data for a sub-band may be signaled within that sub-band.

According to a second aspect the present invention provides a method of determining carrier frequency allocation in a communication system which uses a plurality of sub-carriers arranged in a sequence of chunks, the method comprising: receiving resource allocation data identifying a start chunk and an end chunk within the sequence of chunks; holding information which relates resource allocation data to the sequence of chunks of sub-carriers; and determining the allocated sub-carriers using the received resource allocation data and the held information.

The receiving step may receive resource allocation data comprising: a bit pattern and a resource aforementioned in the first aspect. That is the resource allocation data comprises; a bit pattern which defines a grouping of the sequence of chunks into a sequence or groups, in dependence upon the sub-carriers allocated to each user device; and a resource ID for one of the groups, which resource ID depends upon the position of that group within the sequence of groups.

The receiving step may receive the bit pattern in a common signaling channel common of the communication system.

The receiving step may receive the resource ID in a dedicated signaling channel of the communication system.

The bit pattern may include a bit associated with each of the second and subsequent chunks in the sequence of chunks, whose value defines whether or not the associated chunk is the start of a new group in the sequence of groups.

The bit pattern may comprise N−1 bits, where N is the number of chunks in the sequence of chunks.

The received resource ID may identify the one of the groups by its position within the sequence of groups.

The determining step may use the resource ID to identify the positions of associated bits within the bit pattern and to determine the start and end chunks from the determined bit positions.

The receiving step may comprise receiving resource allocation data which comprises a value which is related to data identifying the start and end chunks through a predetermined mapping, wherein the held information defines the mapping and wherein the determining step determines the sub-carrier allocation using the received resource allocation data and the mapping.

The mapping may be defined by one or more equations.

The determining step may determine a value, O, corresponding to the start chunk and a value, P, identifying the number of consecutive chunks between the start chunk and the end chunk from the following expression:

$$a = \left\lfloor \frac{x}{N} \right\rfloor + 1$$
$$b = x \bmod N$$
$$\text{if}(a + b > N)$$
$$\quad P = N + 2 - a$$
$$\quad O = N - 1 - b$$
$$\text{else}$$
$$\quad P = a$$
$$\quad O = b$$

where $\lfloor \rfloor$ is the floor function, N is the total number of chunks in the sequence and x is the received value, and wherein the determining step may determine the sub-carrier allocation using the values, O and P, thus obtained.

The mapping may be defined by a data structure that defines a code tree comprising a plurality of leaf nodes and having a depth corresponding to the number of chunks in the sequence of chunks.

The mapping may be defined by a look up table.

The receiving step may receive the resource allocation data in a dedicated signaling channel of the communication system.

The received resource allocation data may comprise data that identifies a type of allocation of the sub-carriers, and the determination made in the determining step may depend upon the identified type of allocation.

One type of allocation may be a localised chunk allocation which a user device is allocated a set of consecutive chunks of sub-carriers, and the determining step may determine the sub-carrier allocation as being the set of contiguous sub-carriers of the chunk or chunks within and between the identified start and end chunks.

One type of allocation may be a distributed chunk allocation, in which a user device is allocated a set of distributed chunks of sub-carriers, and the determining step may comprise the steps of determining the number of chunks between the identified start and end chunks and determining a chunk spacing by dividing the total number of chunks in the sequence by the number of chunks between the identified start and end chunks.

The determining step may determine a start chunk in dependence upon chunk allocations for other user devices.

One type of allocation may be a distributed sub-carrier allocation, in which a user device is allocated a set of distributed sub-carriers, and the determining step may comprise the steps of determining the number of chunks between the identified start and end chunks and determining a sub-carrier spacing by dividing the total number of chunks in the sequence by the number of chunks between the identified start and cod chunks.

The determining step may determine a start sub-carrier in dependence upon sub carrier allocations for other user devices.

The communication system, may use a plurality of sub-bands, each of which may comprise sub-carriers arranged in a sequence of chunks, and wherein the method receives respective resource allocation data for sub-carrier allocation in a plurality of the sub-bands.

The resource allocation data for a sub-band may be received within that sub-band.

The allocation data may be encoded and the determining step may comprise the step of decoding the allocation data to determine the start and end chunks or to identify data defining the start and end chunks.

According to a third aspect, there is provided a communication node (station) which is operable to communicate with a plurality of user devices using a plurality of sub-carriers arranged in a sequence of chunks and which is operable to signal sub-carrier allocations to each of the user devices using a method according to any of the first aspect.

According to a fourth aspect, there is provided a user device which is operable to communicate with the communication node (station) of the third aspect and which is operable to determine a sub-carrier allocation using the method of any of the second aspect.

According to a fifth aspect, there are provided computer implementable instructions for causing a programmable computer device to perform the signaling method of any of the first aspect.

According to a sixth aspect, there are provided computer implementable instructions for causing a programmable computer device to perform the method of determining sub-carrier allocation of any of the second aspect.

The computer implementable instructions of the fifth or sixth aspect may be recorded on a computer readable medium.

According to a seventh aspect, specifically, there is provided a communication lode (or station) which is operable to communicate with a plurality of user devices using a plurality of sub-carriers arranged in a sequence of chunks, the communications node comprising: a receiver operable to receive an allocation of the sub-carriers for each of a plurality of user devices; a processor operable to process the received allocations to determine, for each user device, data identifying a start chunk and an end chunk within the sequence of chunks, which depend upon the subs carriers allocated to the user device; a generator operable to generate respective resource allocation data for each of the user devices using the data identifying the corresponding start chunk and end chunk determined by the processor; and an output operable to output the respective resource allocation data to each of the plurality of user devices.

According to an eighth aspect, specifically, there is provided a user device which is operable to communicate with a communication node which is operable to communicate with a plurality of user devices using a plurality of sub-carriers arranged in a sequence of chunks, the user device comprising: a receiver operable to receive resource allocation data identifying a start chunk and an end chunk within the sequence of chunks; a memory or circuit operable to hold information relating the resource allocation data to the sequence of chunks; and a determiner operable to determine the allocated sub-carriers using the received resource allocation data and the held information.

According to further aspect, there are provided; a method of or apparatus for signaling sub-carrier allocations substantially as described herein with reference to or as shown in the accompanying figures; and a method of or apparatus for receiving and decoding a sub-carrier allocation substantially as described herein with reference to or as shown in the accompanying figures.

These and various other aspects of the invention will become apparent, from the following detailed description of modes which are given by way of example only and which are described with reference to the accompanying figures.

BRIEF DESCRIPTION OF THE DRAWINGS

FIG. 5B illustrates the way in which the same encoding technique can be used to allocate the sub-carriers using a distributed chunk allocation in which each mobile telephone is allocated a set of chunks dispersed across its supported bandwidth;

FIG. 6 is a flow chart illustrating the processing carried out by an encoder module forming part of the base station shown in FIG. 3;

MODES CARRYING OUT THE INVENTION

Overview

Figure 1:
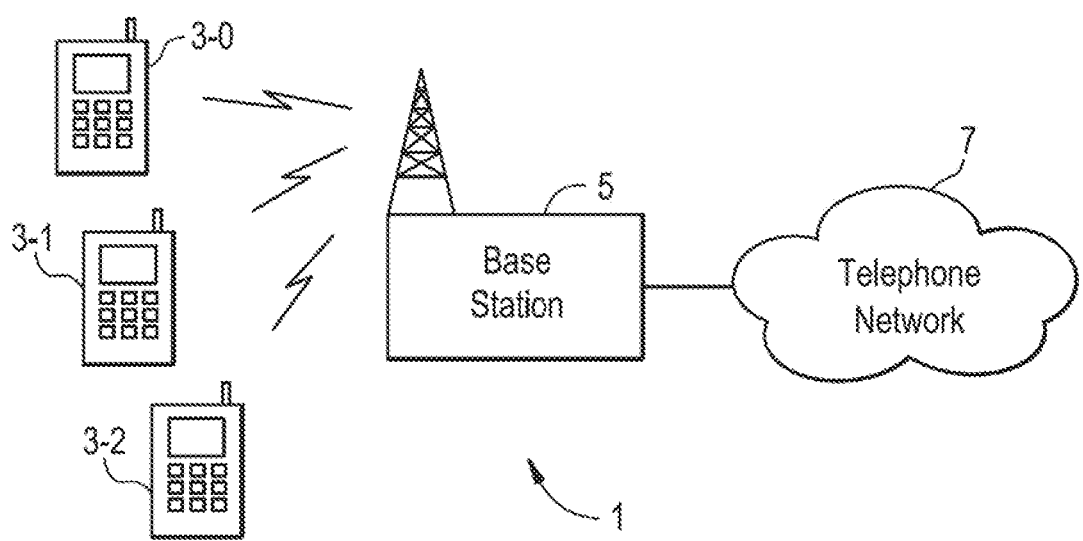
FIG. 1 schematically illustrates a communication system comprising a number of user mobile (cellular) telephones which communicate with a base station connected to the telephone network.

FIG. 1 schematically illustrates a mobile (cellular) telecommunication system which users of mobile telephones 3-0, and 3-2 can communicate with other users (not shown) via, a base station 5 and a telephone network 7. In this mode, the base station 5 uses an orthogonal frequency division multiple access (OFDMA) technique in which the data to be transmitted to the mobile telephones 3 is modulated onto a plurality of sub-carriers. Different sub-carriers are allocated to each mobile telephone 3 depending on the supported bandwidth of the mobile telephone 3 and the amount of data to be sent to the mobile telephone 3, in this mode the base station 5 also allocates the sub-carriers used to carry the data to the respective mobile telephones 3 in order to try to maintain a uniform distribution of the mobile telephones 3 operating across the base station's bandwidth. To achieve these goals, the base station 5 dynamically allocates sub-carriers for each mobile telephone 3 and signals the allocations for each time point (sub-frame) to each of the scheduled mobile telephones 3.

Figure 2:
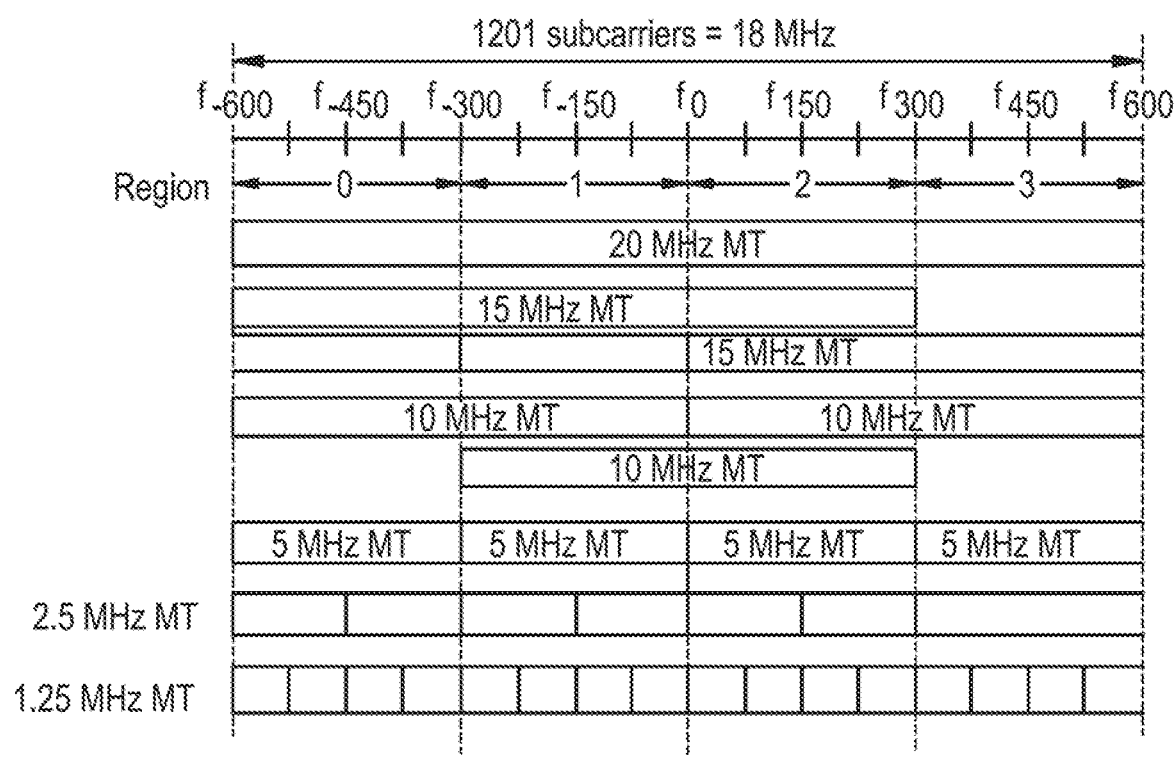
FIG. 2 illustrates the way in which a communication bandwidth of the base station shown in FIG. 1 can be allocated to a number of different mobile telephones having different supported bandwidths.

FIG. 2 illustrates an example of the way in which the base station 5 can allocate sub-carriers within us supported bandwidth to different mobile telephones 3 having different supported bandwidths. In this mode, the base station 5 has a supported bandwidth of 20 MHz of which 18 MHz is used for data transmission. In FIG. 2, MT represents, mobile terminal.

In order that each of the mobile telephones 3 can be informed about the scheduling decision within each sub-band, each mobile telephone 3 requires a shared control channel within its camped frequency band. The information signaled within this control channel will include;
 i) resource block allocation information for both downlink communications and uplink communications);
 ii) resource block demodulation information for the downlink;
 iii) resource block demodulation information for the uplink;
 iv) ACK/NACK for uplink transmissions; and
 v) timing control bits.

Since the number of bits available in the control channel is limited, efficient methods are needed to transport the required information with the lowest number of bits. The invention relates to the way in which the resource allocation information can be signaled in an efficient manner to each of the mobile telephones 3.

Base Station

Figure 3:
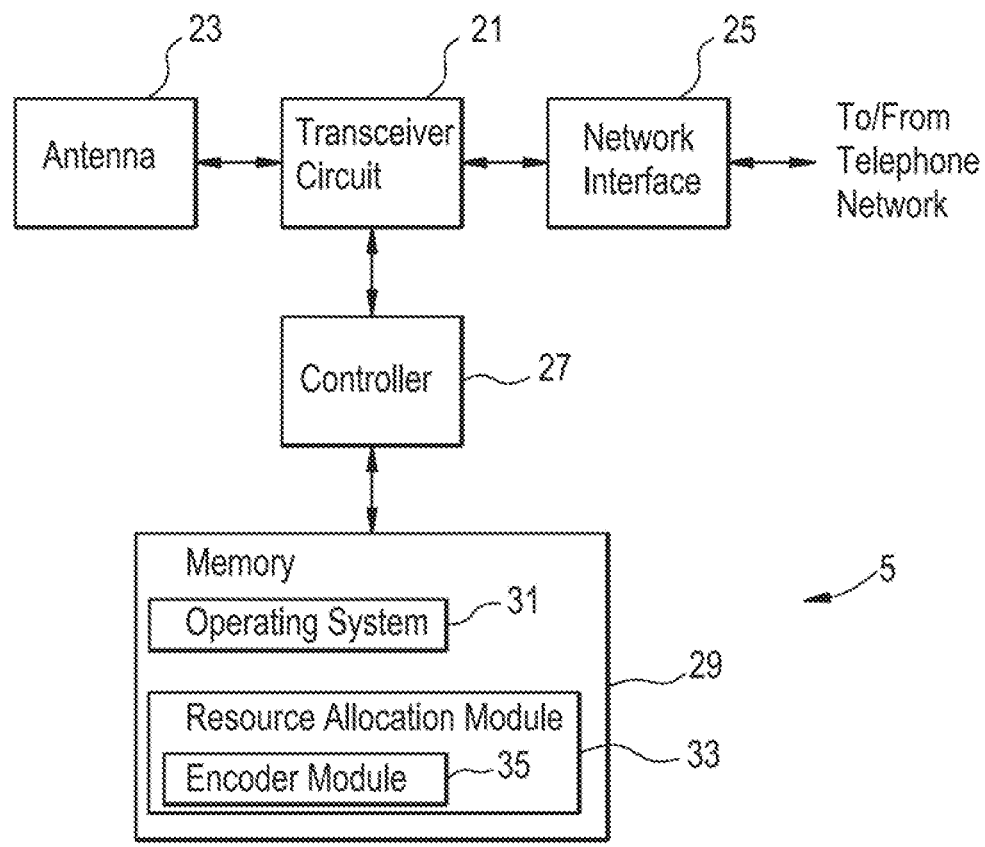
FIG. 3 is a block diagram illustrating the main components of the base station shown in FIG. 1.

FIG. 3 is a block diagram illustrating the main components of the base station, used in this mode. As shown, the base station 5 includes a transceiver circuit 21 which is operable to transmit signals to and to receive signals from the mobile telephones 3 via one or more antennae 23 (using the above described sub-carriers) and which is operable to transmit signals to and to receive signals from the telephone network 7 via a network interface 25. The operation of the transceiver circuit 21 is controlled by a controller 27 in accordance with software stored in memory 29. The software includes, among other things, an operating system 31 and a resource allocation module 33. The resource allocation module 33 is operable for allocating the sub-carriers used by the transceiver circuit 21 in its communications with the mobile telephones 3. As shown in FIG. 3, the resource allocation module 33 also includes an encoder module 35 which encodes the allocation into an efficient representation which is then communicated to the respective mobile telephones 3.

In this mode, the base station 5 can use three different types of sub-carrier allocation:
 i) localised chunk allocation in which each mobile telephone 3 is allocated a set of consecutive chunks of sub-carriers, where, in this mode, each chunk is a set of 25 consecutive sub-carriers;
 ii) distributed chunk allocation in which each mobile telephone 3 is allocated a set of chunks dispersed across the bandwidth supported by the mobile telephone 3; and
 iii) a distributed sub-carrier allocation in Which each mobile telephone 3 is allocated a set of possibly discontinuous sub-carriers dispersed across the bandwidth supported by the mobile telephone 3.

First Encoding Technique

Figure 4:
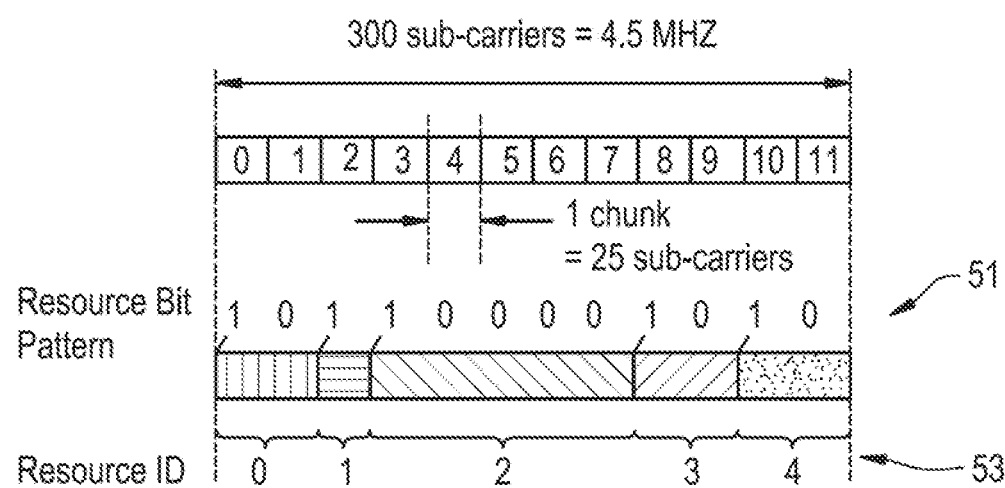
FIG. 4 illustrates the way in which chunks of sub-carriers within a 5 MHz sub-band can be grouped into a plurality of groups for allocation to the different mobile telephones.

A first encoding technique that the encoder module 35 can use to encode the above described resource allocation information will now be described with reference to FIGS. 4 to 6. FIG. 4 schematically illustrates the way in which the 300 sub-carriers within a 5 MHz sub-band of the base station's operating bandwidth are divided into a sequence of twelve chunks (labeled 0, 1, 2, 3, . . . 11), each comprising 25 sub-carriers. Information defining this arrangement of chunks may be stored as data within the memory of the base station 5 (and in the mobile telephones 3) or it may be defined in the software or hardware circuits running therein. FIG. 4 also illustrates the way in which the encoder module 35 partitions, in this mode, the chunks of sub-carriers to a sequence of groups (in this case five groups), depending on the current sub-carrier allocation. In the example illustrated in FIG. 4, the first group comprises chunks 0 and 1; the second group comprises chunk 3; the third group comprises chunks 3 to 7; the fourth group comprises chunks 8 and 9; and the fifth group comprises chunks 10 and 11.

FIG. 4 also illustrates a resource allocation bit pattern 51 that is generated by the encoder module 35 and that defines this grouping of the chunks. As shown, the resource allocation bit pattern 51 includes one bit for each of the twelve chunks within the sub-band, which is set to a value of "1" when the corresponding chunk is the first chunk in a new group and otherwise it is set to a value of "0". As those skilled in the art will appreciate, the first bit of the twelve bit pattern 51 is redundant and does not need to be signaled (transmitted) because the first chunk within the sub-band will always be the first chunk within the first group.

FIG. 4 also illustrates a resource ID 53 which is provided for each of the defined groups. As shown, in this mode, the resource ID for a group identifies the group by its position within the sequence or groups. In particular, the resource IDs are implicitly numbered from left to right corresponding to the associated group's position within the sequence of groups.

Each mobile telephone 3 is then informed of its allocation each 5 MHz sub-band by signaling the corresponding resource allocation bit pattern 51 and one of the resource IDS 53. In this mode, the resource allocation bit patterns 51 are signaled to the mobile telephones 3 over a common signaling channel in each 5 MHz sub-band and the resource ID(s) 53 for each mobile telephone 3 are individually signaled in its dedicated control channel. In this mode, each resource ID 53 is signaled as a 3 bit number leading to a maximum number of eight mobile telephones 3 that can be scheduled per 5 MHz sub-band. Mobile telephones 3 with larger bandwidths can combine multiple 5 MHz sub-bands and decode their total resource allocation from the resource allocation bit pattern 51 and the resource ID 53 from each sub-band.

As those skilled in the art will appreciate, the way in which the encoder module 35 generates the above described resource allocation bit patterns 51 and resource IDs 53 will vary depending on how the sub-carriers have been allocated (i.e., using localised chunk allocations distributed chunk allocation or distributed sub-carrier allocation). Examples of these different types of allocations will now be described with reference to FIG. 5.

Localised Chunk Allocation

Figure 5A:
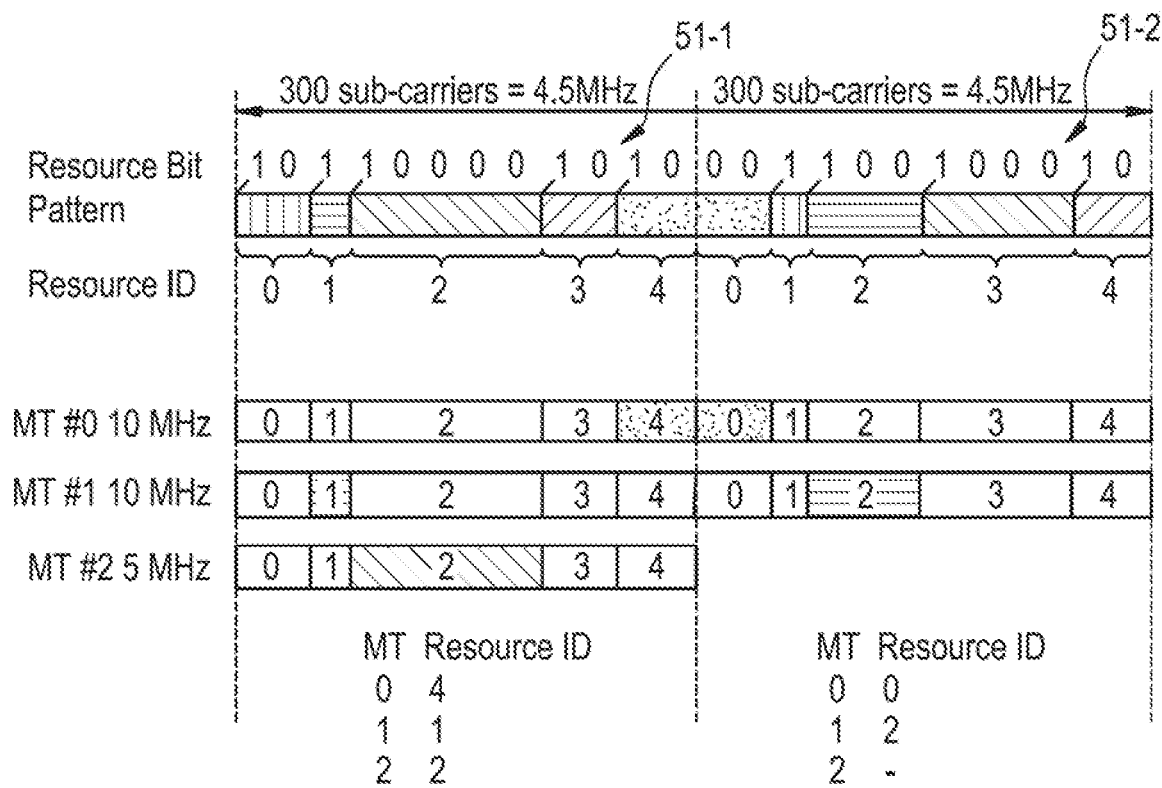
FIG. 5A illustrates the way in which sub-carriers can be allocated based on a localised allocation in which each mobile telephone is allocated a set of consecutive chunks of sub-carriers.

FIG. 5A illustrates one example where the sub-carriers have been allocated to the three mobile telephones 3 shown in FIG. 1 using a localised chunk allocation. In particular, in this example, mobile telephone 3-0 has a supported bandwidth of 10 MHz and is allocated chunks 10 and 11 in the first sub-band and chunks 0 and 1 in the second sub-band. Similarly, in this example, telephone 3-1 has a supported bandwidth of 10 MHz and is allocated chunk 2 in the first sub-band and chunks 3, 4, and 5 in the second sub-band. Note, the first sub-band means the first 300 sub-carriers (labeled 51-1) in FIG. 5A, and the second sub-band means the second 300 sub-carriers (labeled 51-2) in FIG. 5A. Finally, in this example, mobile telephone 3-2 has a supported bandwidth of 5 MHz and is allocated chunks 3, 4, 5, 6 and 7 within the first sub-band. FIG. 5A shows the two different resource bit patterns 51-1 and 51-2 and the corresponding resource IDs generated by the encoder module 35 for the two illustrated sub-bands. FIG. 5A also illustrates at the bottom of the figure the resource ID that is signaled to the respective mobile telephones 3. As each mobile telephone 3 receives only 1 resource ID for each 5 MHz sub-band that it occupies, its sub-carrier allocation is contiguous within each sub-band. However, a mobile telephone 3, having a 10 MHz supported bandwidth can be assigned resources in each of the 5 MHz sub-bands it occupies, and these resources need not be contiguous with each other, as illustrated in FIG. 5A for mobile telephone 3-1.

As discussed above, in this mode, it is assumed that at most eight mobile telephones can be scheduled within each 5 MHz sub-band at each time point (sub-frame). It may therefore appear that there is some redundancy in the twelve bit resource allocation bit pattern 51 (which could ally up to twelve resource IDs to be defined within each sub-band). However, even in the case that the maximum number of eight mobile telephones 3 are scheduled within a sub-band, it is still possible some sub-carriers are not used. For example, if eight mobile telephones 3 are allocated one chunk of sub-carriers and the remaining 4 unused chunks are not in a contiguous block, then up to twelve bits (or eleven if you ignore the first bit as discussed above) are still needed to define the partitioning of chunks to achieve the desired allocation.

Distributed Chunk Allocation

FIG. 5B illustrates the way in which the same type of resource allocation bit pattern 51 and resource ID 53 can be used when a distributed chunk allocation scheme is employed. FIG. 5B illustrates the actual chunk allocation 61 for 5 different mobile telephones 3, identified by the different shadings. In the illustrated example, one mobile telephone 3 is allocated 6 chunks (namely chunks 0, 2, 4, 6, 8 and 10); one mobile telephone is allocated 3 chunks (namely chunks 1, 5 and 9); and the other 3 mobile telephones 3 are each allocated 1 chunk of sub-carriers. In this mode, to facilitate the decoding of the resource allocation data in the mobile telephones 3, the partitioning of the chunks is arranged in decreasing order in terms of the number of chunks per group. For the example shown in FIG. 5B this means that the group comprising 6 chunks is positioned first, followed by the group comprising 3 chunks, followed by the 3 remaining groups each comprising 1 chunk. As the resource IDs for these groups of chunks are numbered from left to right, this means that the mobile telephone 3 with the largest number of allocated chunks is given the smallest ID, the user with the second largest number of allocated chunks is given the next smallest ID etc. As will be apparent to those skilled in the art, the number of chunks allocated to each mobile telephone 3 needs to be a consideration in the number of chunks allocated to other mobile telephones 3 with a lower resource ID, in order to avoid resource collision during resource signaling decoding.

Distributed Sub-Carrier Allocation

Figure 5C:
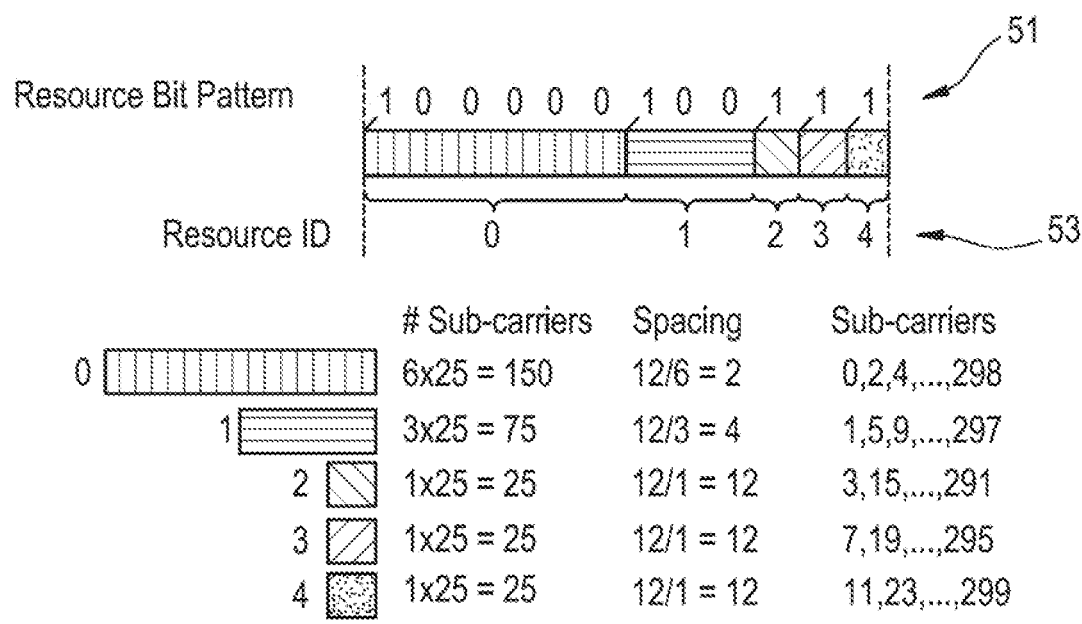
FIG. 5C illustrates the way in which the same encoding technique can be used to allocate the sub-carriers using a distributed sub-carrier allocation in which each mobile telephone is allocated a set of possibly discontinuous sub-carriers dispersed across its supported bandwidth.

FIG. 5C schematically illustrates an example of a distributed sub-carrier allocation that may be employed. As with the example illustrated in FIG. 5B, in the example shown in FIG. 5C, there are five mobile telephones, with the first mobile telephone 3 been allocated sub-carriers 0, 2, 4, . . . , 298; with the second mobile telephone 3 been allocated sub-carriers 1, 5, 9, . . . 297; with the third mobile telephone 3 been allocated sub-carriers 3, 15, . . . 291; with the fourth mobile telephone 3 been allocated sub-carriers 7, 19, . . . 295; and with the fifth mobile telephone 3 been allocated sub-carriers 11, 23, . . . 299. In this illustrated example, the spacing between the sub-carriers allocated to the first mobile telephone 3 is two, that between the sub-carriers allocated to the second mobile telephone 3 equals 4 and that between the sub-carriers allocated to the 3 remaining mobile telephones equals 12. In this illustrative example, all the mobile telephones 3 occupy the 6 available chunks but with different sub-carrier spacing. The allocation is identical to the distributed chunk allocation repeated to span the entire S MHz bandwidth with the chunk bandwidth replaced by the sub25 carrier bandwidth. FIG. 5C illustrates the resulting resource allocation it pattern 51 and resource IDs 53 for this sub-carrier allocation.

Allocation Type Bits

As those skilled in the art will appreciate, in order that the mobile telephones 3 can determine the correct sub-carrier allocation, they must be informed of the type of sub-carrier allocation that has been made (i.e., localised chunk allocation, distributed chunk allocation or distributed sub-carrier allocation). This information is signaled to all of the mobile telephones 3 using the following two bit allocation type pattern:

| Allocation Type Pattern | | Allocation Type |
|---|---|---|
| 0 | 0 | Localised chunk |
| 0 | 1 | Distributed chunk |
| 1 | 1 | Distributed sub-carrier |

As will be described in more detail below, the mobile telephones 3 use this allocation type bit pattern to identify how they should interpret the group of chunks that has been assigned to it, using the resource allocation bit pattern 51 and the resource ID 53.

Summary of Encoder Module Operation

FIG. 6 is a flow chart illustrating the main processing steps carried out by the encoder module 35 to determine the above described resource allocation bit patterns 51 and resource IDs 53 for the different mobile telephones 3 scheduled for a current time point. As shown, in step s1, the encoder module 35 receives the current sub-carrier allocation, which includes details as to whether or not the allocation is in accordance with the localised chunk allocation scheme, distributed chunk, allocation scheme or distributed sub-carrier allocation scheme. In step s3, the encoder module 35 partitions the chunks of sub-carriers in each of the base station's four 5 MHz sub-bands into groups, based on the received sub-carrier allocation. As those skilled in the art will appreciate the processing performed in step s3 will depend on the type of sub-carrier allocation that has been performed. In step s5, the encoder module 35 generates the above described resource allocation bit pattern 51 for each 5 MHz sub-band, that represents the partition of chunks in that sub-band. Then, in step s7, the encoder module 35 generates a resource ID for each group of chunks in each sub-band for signaling to the corresponding mobile telephone 3.

After the resource IDs 53 have been generated for the groups of chunks in each 5 MHz sub-band, the processing proceeds to step s9 where the encoder module 35 signals (transmits) the generated resource allocation bit patterns 51 to all of the mobile telephones 3. In particular, in this step, the encoder module 35 causes the transceiver circuit 21 to signal, within a common signaling channel in each 5 MHz sub-band, the resource allocation bit pattern 51 representing the partitioning of the chunks within that sub-band. The mobile telephones 3 will therefore be able to receive the resource allocation bit patterns 51 for all the sub-bands in which they operate. For example, if mobile telephones 3-0 and 3-1 have an operating bandwidth of 10 MHz and mobile telephone 3-2 has art operating bandwidth of 5 MHz, then mobile telephones 3-0 and 3-1 will receive two resource allocation bit patterns 51 within their common signaling channels and mobile telephone 3-2 will receive one resource bit pattern 51 within its common signaling channel. The above described two bit resource allocation type pattern is also transmitted with each resource allocation bit pattern 51 in step s9. After step s9, the processing proceeds to step si 1 where the encoder module 35 signals the respective resource IDs 53 to each mobile telephone 3 within the mobile telephone's dedicated signaling channel in each 5 MHz sub-band.

Therefore, with the first encoding technique for each 5 MHz sub-band, a total of 14 common channel bits are signaled (13 if the first bit of the resource allocation pattern is not signaled) and three resource ID bits for each user device are signaled.

Mobile Telephone

Figure 7:
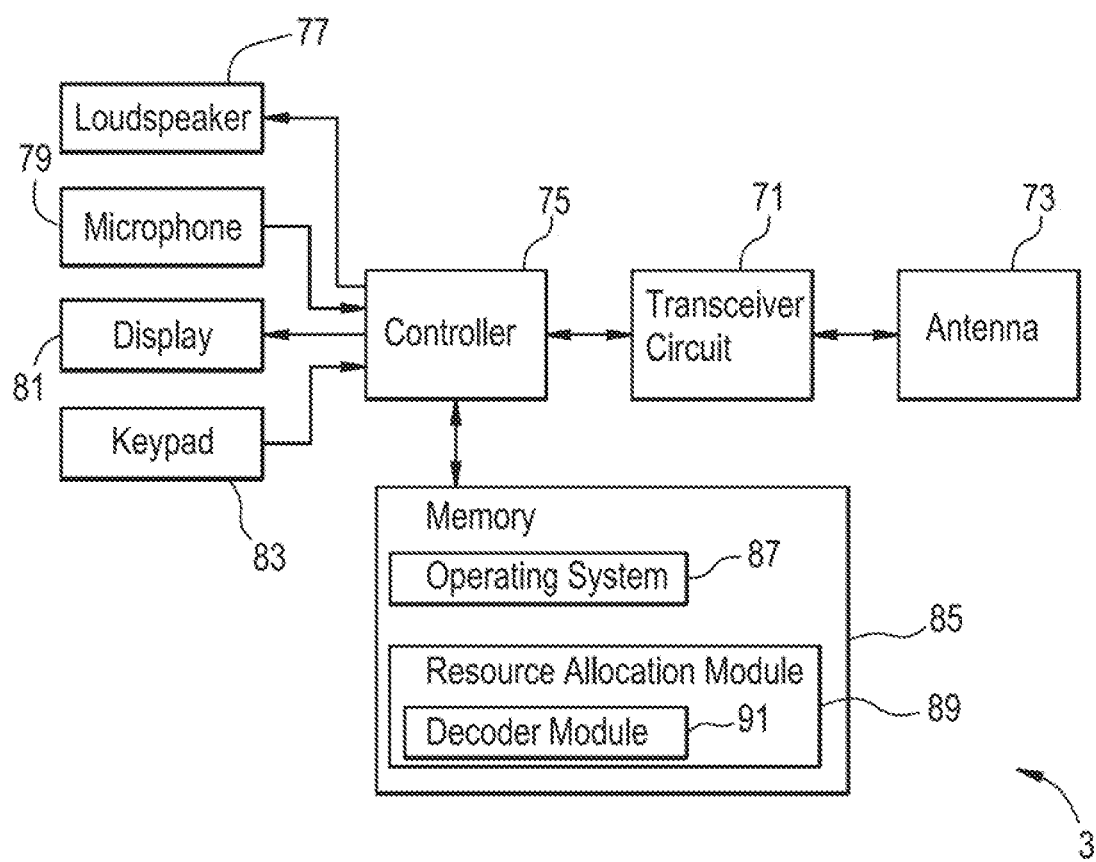
FIG. 7 is a block diagram illustrating the main components of one of the mobile telephones shown in FIG. 1.

FIG. 7 schematically illustrates the main components of each of the mobile telephones 3 shown in FIG. 1. As shown, the mobile telephones 3 include a transceiver circuit 71 which is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87 and a communications module 89. In this mode, the communication module 89 includes a decoder module 91 which is operable to decode the resource allocation data signaled from the base station 5 to determine that mobile telephone's sub-carrier allocation for the current time point.

Figure 8:
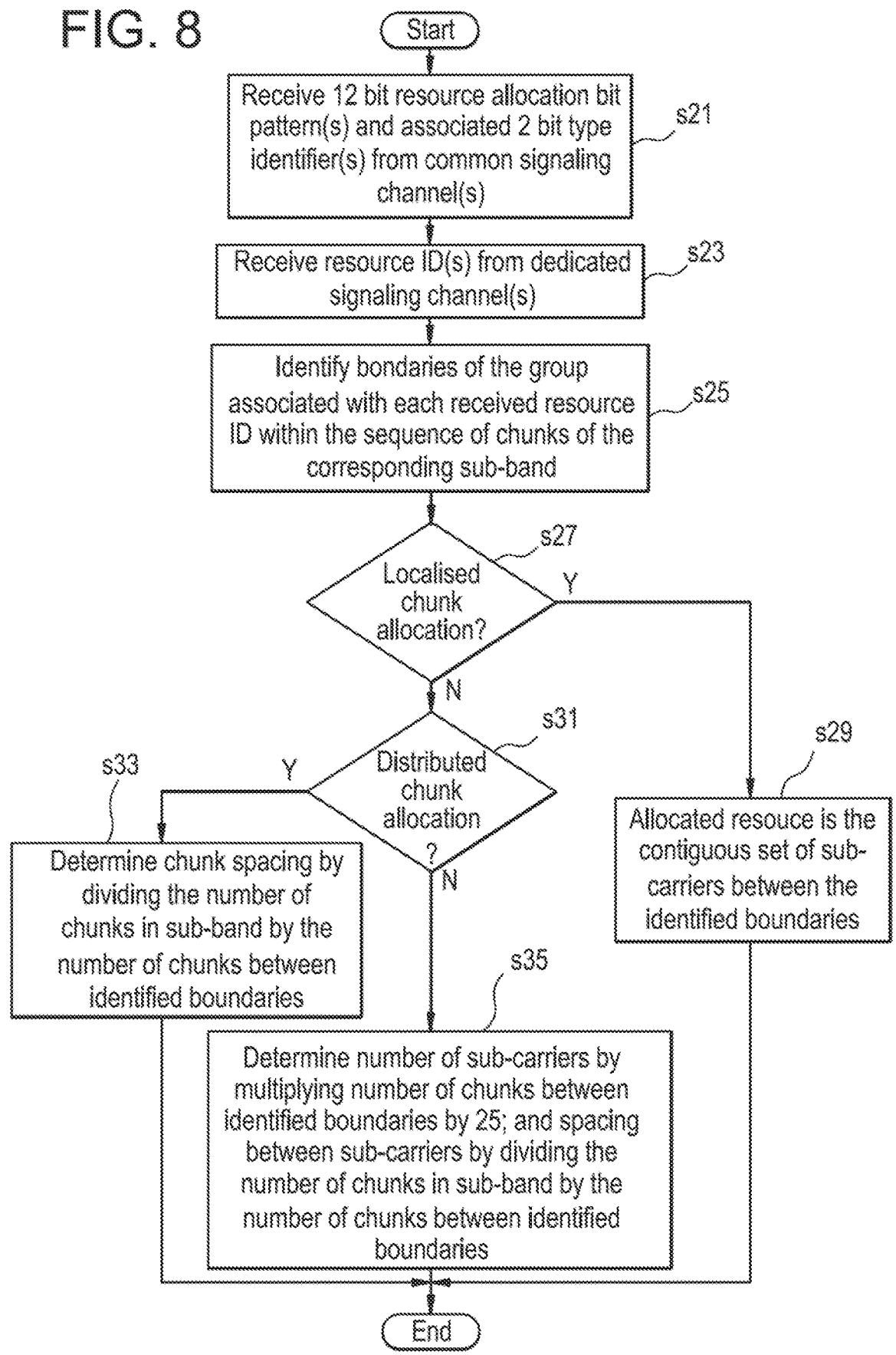
FIG. 8 is a flow chart illustrating the main processing steps carried out by a decoder nodule forming part of the mobile telephone shown in FIG. 7.

The way which the decoder module 91 decodes the resource allocation data received from the base station 5 will now be described with reference to the flowchart shown in FIG. 8. As shown, in step s21, the decoder module 91 receives the resource allocation bit pattern and the associated two bit allocation type pattern from each received communication signaling channel. As will be apparent from the above discussion, the number of resource allocation bit patterns 51 and the number of allocation type patterns received depends on the supported bandwidth of the mobile telephone 3. In step s23, the decoder module 91 receives the resource ID(s) 53 from its dedicated signaling channel(s). The number of resource IDs 53 received also depends on the supported bandwidth of the mobile telephone 3. Then in step s25, the decoder module 91 identifies, for each supported 5 MHz sub-band, the start and end chunks of the group of chunks associated with the resource ID 53 received for that sub-band. The decoder module 91 identifies these start and end chunks using the corresponding resource allocation bit pattern 51 received for that sub-band. For example, if the received resource ID 53 is the binary value "010" corresponding to the resource ID "2", then the decoder module 91 processes the corresponding resource allocation bit pattern 51 to identify the bit positions of the second and third "1s" counting from the left (and ignoring the first bit within the resource allocation bit pattern 51 if it includes 12 bits as the first bit always corresponds to the start of the first group). The bit position of this second "1" identifies the beginning of the group having resource ID "2" and the bit position of the third "1" identifies the chunk that is at the start of the next group within the sequence of groups, from which the decoder module 91 can determine the end chunk of the group having resource ID "2". In the example illustrated in FIG. 5A for the first sub-band, the second "1" in the resource bit allocation pattern 51 (ignoring the first bit) is the fourth bit from the left hand end and the third "1" within the bit pattern 51 is the ninth nit from the left hand end. As can be seen from FIG. 5A, this means that the group of chunks corresponding to the received resource ID of "2" comprises chunks 3 to 7 within that 5 MHz sub-band.

Once the start and end chunks of the group associated with the received resource ID 53 have been determined, the processing proceeds to s27, where the decoder module 91 uses the received two bit allocation type pattern to determine if the allocation is a localised chunk allocation. If it is, then the processing proceeds to step s29 where the decoder module 91 determines that the allocated sub-carriers correspond to the continuous set of sub-carriers within and between the identified start and end chunks. For the above example this will result in the decoder module 91 allocating the sub-carriers within chunks 3 to 7 (inclusive), for communications with the base station 5.

If at step s27, the decoder module 91 determines that the two bit allocation type pattern does not correspond to a localised chunk allocation, then processing proceeds to step s31 where the decoder module 91 determines if the two bit allocation type pattern corresponds to a distributed chunk allocation. If it does, then the processing proceeds to step s33 where the decoder module 91 uses the identified start and end chunks to determine the chunk spacing by dividing the total number of chunks within the sub-band by the number of chunks between the identified start and end chunks. For example, for the distributed chunk allocation illustrated in FIG. 5B and where the received resource ID 53 is "1", the total number of chunks within the sub-band equals 12 and the number of chunks between the identified start and end chunks is 3. Therefore, 3 chunks are allocated within this sub-band that are spaced apart by 4 (12/3=4) chunks. The position of the first of these chunks within the sub-band depends on the sub-carrier allocation for other scheduled mobile telephones 3 within that sub-band. Consequently, when distributed chunk allocation has been selected, the decoder module 91 also considers the chunk allocation for the other mobile telephones 3 scheduled at that time. The decoder module 91 does this by identifying the positions of all of the "1s" within the resource allocation bit pattern 51 to determine the total number of chunks allocated in other groups. For the allocation shown in FIG. 5B, the decoder module will identify that the group corresponding to resource ID "0" has 6 chunks; that the group corresponding to resource ID "1" has 3 chunks and that the remaining groups corresponding to resource IDs "2", "3" and "4" each have 1 chunk. From this information, the decoder module 91 determines that the chunks associated with resource ID "0" be spaced apart by 2 chunks.

In this mode, the distributed chunk allocation scheme is arranged so that the first chunk within the sub-band is always allocated to the first chunk allocated to resource ID "0". Therefore, for the above example, the allocated chunks for resource ID "0" will be chunks 0, 2, 4, 6, 8, and 10. The decoder module 91 then considers the allocated chunks for resource "1". As discussed above, the chunk spacing for resource ID "1" is 4. The decoder module 91 then assigns the first chunk for resource ID "1" as being the first available chunk after the chunks for resource ID "0" have been allocated. In this example, the first unallocated chunk is chunk 1 and therefore, the chunks allocated to resource ID "1" will be chunks 1, 5 and 9, In a similar manner, the first chunk that is available for allocation for resource ID "2" is chunk etc.

As those skilled in the art will appreciate, as the groups of chunks have been ordered so that the largest groups have the lowest resource IDs 53 than its own, in this mode, the bile telephone 3 only needs to consider the chunk allocations for the groups with a lower resource ID 53, when determining the position of its first allocated chunk in the sub-band.

If at step s31, the decoder module 91 determines that the two bit allocation type pattern does not corresponded to a distributed chunk allocation, then the decoder module 91 determines that the allocation corresponds to a distributed sub-carrier allocation as illustrated in FIG. 5C. In this case the processing proceeds to step s35, where the decoder module 91 determines the number of sub-carriers assigned to the mobile telephone 3 by multiplying the number of chunks in the assigned group by the number of sub-carriers in each chunk (i.e. by twenty five). The decoder module 91 also calculates the spacing between the sub-carriers by dividing the total number of chunks in the sub-band by the number of chunks in the allocated group. The position of the first sub-carrier is then determined to be the first sub-carrier available after the sub carriers have been signed for groups associated with resource IDs having lower values, in a similar way to the way in which the starting chunk was determined in the distributed chunk allocation processing described above.

After the decoder module 91 has determined its sub-carrier allocation (either in step s29, step s33 or step s35), the decoder module 91 sends appropriate control signals to the transceiver circuit 71 to control the reception of data using the identified sub-carriers. The processing then ends.

Second Encoding Technique

Figure 9:
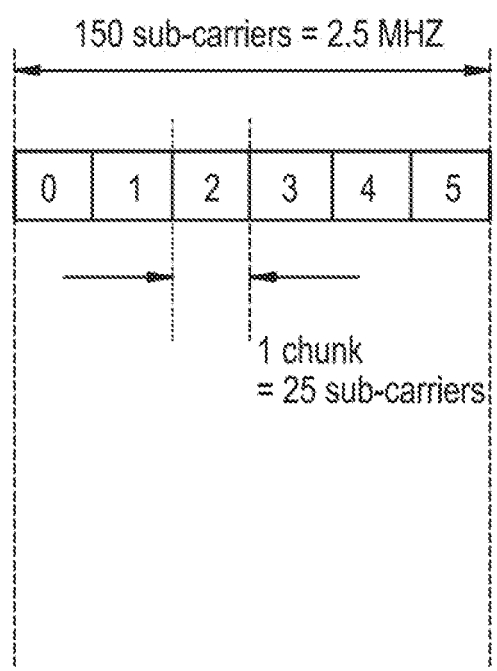
FIG. 9 illustrates the way in which chunks of sub-carriers within a 2.5 MHz sub-band can be grouped into a plurality of groups for allocation to the different mobile telephones.
Figure 10:
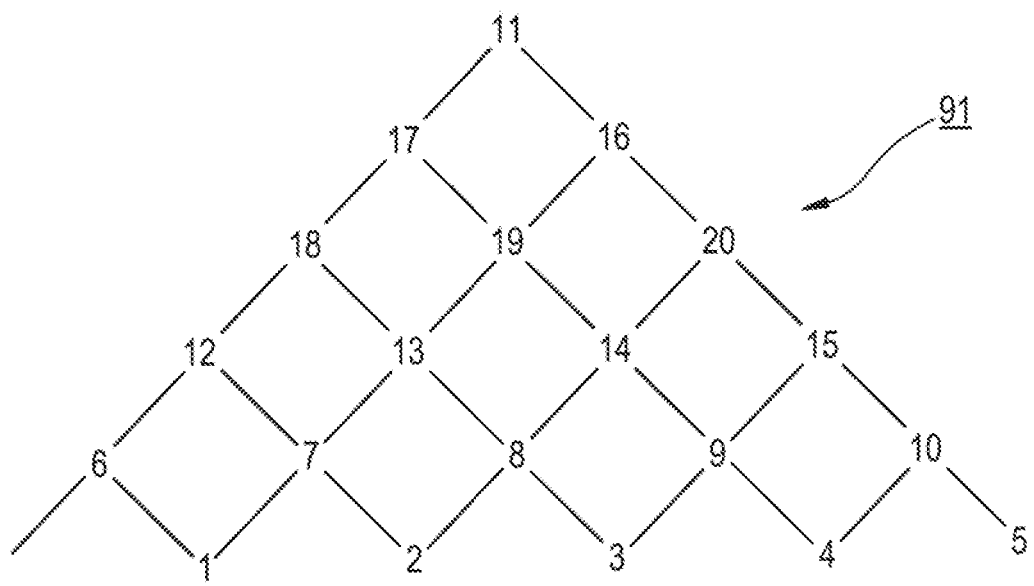
FIG. 10 schematically illustrates a code tree that is used by the encoder module of the base station an alternative mode to encode a start and end chunk defining the sub-carrier allocation for a user.

A second encoding technique that the encoder module 35 within the base station 5 can use to encode the above described resource allocation information will now be described with reference to FIGS. 4, 9 and 10. As illustrated in FIG. 4, the 20 MHz operating bandwidth of the base station 5 can be divided into bands of different sizes, with the smallest sub-band corresponding to a bandwidth of 1.25 MHz. The number of chunks available for each sub-band is given in the table below:

| Sub-Band Bandwidth (MHz) | 1.25 | 2.5 | 5 | 10 | 15 | 20 |
|---|---|---|---|---|---|---|
| Number Of Chunks | 3 | 6 | 12 | 24 | 36 | 48 |

In this second encoding technique, a triangular code tree is used with the number of chunks available for a particular bandwidth equal to the number of leaf nodes at the base of the code tree. For the example of a 2.5 MHz sub-band shown in FIG. 9, which has 6 chunks, the corresponding code me is illustrated in FIG. 10. As shown, the code tree 91 is formed a tree of nodes having a depth of N nodes corresponding to the number of chunks within the sub-band and having N leaf nodes in the bottom row of the code tree 91. In this example, there are six chunks and therefore, the tree has a depth of 6. The total number of nodes within the tree equals N(N+1)/2. A node number from this tree can therefore be signaled using cell (log.sub.2(N*(N+1)/2)) number of bits. The exact number of bits required for each bandwidth is shown in the table below:

| MHz | 1.25 | 2.5 | 5 | 10 | 15 | 20 |
|---|---|---|---|---|---|---|
| N | 3 | 6 | 12 | 24 | 36 | 48 |
| Number Of Bits | 3 | 5 | 7 | 9 | 10 | 11 |

In this mode, the node numbering is designed to optimise the number of signaling bits required to signal a particular resource allocation. In the example illustrated in the FIGS. 9 and 10, for a 2.5 MHz bandwidth, a five bit number is signaled to uniquely determine the starting chunk and the number of consecutive chunks allocated (which identifies the end chunk). In the general case where there are N chunks within the sub-band, the starting chunk (O) and the number of consecutive chunks (P) that are allocated can be signaled as an unsigned integer x as follows:

$$\text{if}(P-1) \leq \left\lceil \frac{N}{2} \right\rceil$$
$$x = N(P-1) + O$$
$$\text{else}$$
$$x = N(N-(P-1)) + (N-1-O)$$

where $\lceil r \rceil$ is the ceiling function, i.e., the smallest integer not less an r.

At the receiver, the values of P and O can be then be extracted as follows:

$$a = \left\lfloor \frac{x}{N} \right\rfloor + 1$$

b = x mod N
if(a + b > N)
  P = N + 2 − a
  O = N − 1 − b
else
  P = a
  O = b where $\lfloor r \rfloor$ is the or function, ie the largest integer not greater than r.

One advantage with this encoding technique is that no look up table (or code tree structure) is required to can out the encoding or decoding. Further, the division by N performed by the receiver can also be implemented by a simple multiplication and shift operation.

For localised chunk allocation each mobile telephone 3 will be signaled a node number, which maps to a set of leaf chunks. As an example, if one mobile telephone 3 is allocated chunks 0 and 1, another mobile telephone is allocated chunks 2, 3 and 4 and a third mobile telephone 3 is allocated chunk 5 from the 2.5 MHz bandwidth illustrated in FIG. 9, then the first mobile telephone 3 will be signaled the value 6, the second mobile telephone 3 will be signaled the value 14, and the third mobile telephone 3 will be signaled the value 5. These values are preferably determined using the first equation given above. Alternatively, these node numbers can be determined from the tree structure 91 by identifying the root node that is common to the allocated chunks. For example, for the first mobile telephone 3, where the allocated chunks correspond to chunks 0 and 1, the root node that is common to these nodes is the node numbered 6. Similarly, for the second mobile telephone 3, which has been allocated chunks 2, 3 and 4, the node which is the common root for the starting chunk 2 and the end chunk 4 is the node numbered 14. Finally, for the third mobile telephone that has been allocated chunk 5, since there is only 1 chunk, there is no common node and therefore the node number that is signaled corresponds to the allocated chunk number (i.e. 5).

In the case of a distributed chunk allocation for the same bandwidth, the same equations can be used to signal the chunks that have been allocated. For example, if a mobile telephone 3 is allocated chunks 1 and 5, then the number 16 is signaled together with a distributed chunk allocation indicator. At the mobile telephone, the P and O values are decoded in the same manner as discussed above, however, their interpretation is different. In particular, with distributed chunk allocation, the value of P denotes the chunk spacing and the value of O denotes the first chunk in the distributed allocation.

Multiplexing of distributed chunk allocation and localised chunk allocation at the same time point is also easily supported using this encoding method. For example, one mobile telephone 3 may allocated a localised allocation and signaled the value 14, which maps to chunks 2, 3, and 4 whilst another mobile telephone is allocated a distributed chunk allocation and signaled the value 16, which maps to chunks 1 and 5.

Distributed sub-carrier allocation with different spacing for different mobile telephones can also be supported using the above encoding scheme. In this case, the values of O and P are also interpreted in a different way. In this case, as distributed sub-carrier allocation has been selected, the value of O will identify the allocated sub-carrier offset and the value of P will define the spacing between the sub-carriers. For example, if a mobile telephone 3 is signaled the value 16 and an indication that distributed sub-carrier allocation has been made, then the sub-carrier offset will be 1 and the sub-carrier spacing will be 5. Similarly, a mobile telephone 3 signaled the value 14 and a distributed sub-carrier indicator will assume a sub-carrier offset of 2 and a sub-carrier spacing of 3. As those skilled in the art will appreciate multiplexing of localised chunk and distributed sub-carrier is not possible with this encoding technique.

Although the above examples illustrate the situation for a 2.5 MHz sub-band, this is for ease of illustration only. Resource allocation within the base station's total bandwidth can be accomplished in units of the downlink reception capability of the different mobile telephones 3. For example, if all mobile telephones 3 can receive at least 5 MHz, then the resource allocation at the base station 5 can be done in units of 5 MHz. Larger bandwidth mobile telephones 3 can then combine control channels over multiple 5 MHz bands to decide their resource allocation.

MODIFICATIONS AND ALTERNATIVES

A number of detailed modes have been described above. As those skilled in the art will appreciate, a number of modifications and alternatives can be made to the above modes whilst still benefiting from the inventions embodied therein. By way of illustration only a number of these alternatives and modifications will now be described.

In the above modes, a mobile telephone based telecommunication system was described in which the above described signaling techniques were employed. As those skilled in the art will appreciate, the signaling of such resource allocation data can be employed in any communication system that uses a plurality of sub-carriers. In particular, the signaling techniques described above can be used in wire or wireless based communications either using electromagnetic signals or acoustic signals to carry the data. In the general case, the base station would be replaced by a communication node which communicates with a number of different user devices. User devices may include, for example, personal digital assistants, laptop computers, web browsers, etc.

In the above modes, the base station was assumed to have an operating bandwidth of 20 MHz (which was divided into a number of sub-bands) and the chunks of carrier frequencies were defined to comprise 25 sub-carriers each. As those skilled in the art will appreciate, the invention is not limited to this particular size of bandwidth or chunk size or to the size of the sub-bands described.

In the first encoding technique described above, the base station partitioned the chunks within the sub-band into a number of groups. The beginning and end of these groups were then identified by bits within a resource allocation bit pattern. In the example, a "1" within this bit pattern represented the beginning of a new group. As those skilled in the art will appreciate, other encoding schemes could be used. For example, a "0" could be used to define the start of each group. Alternatively, a change in bit value may be used to define the start of each group.

In the first encoding technique described above, the resource ID allocated for each sub-band was transmitted to each mobile telephone over a dedicated signaling channel. As those skilled in the art will appreciate, this resource ID information may instead be signaled within the common signaling channel. In this case, the user devices ID corresponding to each resource ID will be signaled within the common signaling channel, so that each user device can identify the resource ID allocated to it.

In the first encoding technique described above, the base station and mobile telephone implicitly numbered the groups and the chunks from left to right within the sub-band. As those skilled in the art will appreciate, this is not essential. The numbering of the groups and chunks may be performed in other ways such as from right to left. Provided both the base station 5 and the mobile telephones 3 know the numbering scheme in advance, the above encoding can be carried out.

In the above encoding schemes, the base station 5 was able to allocate sub-carriers using a number of different allocation techniques. As those skilled in the art will appreciate, one or more of these allocation techniques may be dispensed with. Further, if only one allocation technique is used, then there is no need to signal a separate allocation type bit pattern.

In the second encoding technique described above, a mapping was defined between the chunks and a unique number which represented the combination of a start chunk and an end chunk within a sequence of chunks allocated to the user. As those skilled in the art will appreciate, this mapping may be defined in any appropriate way, such as using an equation or using a lookup table. The use of an equation is preferred as it removes the need to store a lookup table both in the base station 5 and in each of the mobile telephones 3.

In the above modes, a number of software modules were described. As those skilled will appreciate, the software modules may be provided in compiled or un-compiled form and may be supplied to the base station or to the mobile telephone as a signal over a computer network, or on a recording medium. Further, the functionality performed by part or all of this software may be performed using one or more dedicated hardware circuits. However, the use of software modules is preferred as it facilitates the updating of base station 5 and the mobile telephones 3 in order to update their functionalities.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

The invention claimed is:

1. A communication device configured to communicate with a communication node, the communication device comprising:
a transceiver and a controller, wherein the controller is configured to:
control the transceiver to receive, from the communication node, downlink control information comprising information indicating a resource indication value, and
interpret the information indicating the resource indication value, based on the downlink control information,
wherein the resource indication value is defined by one of a first expression and a second expression,
wherein the first expression is $N(P-1)+O$,
wherein the second expression is $N(N-(P-1))+(N-1-O)$, and
wherein N is a number of resource blocks in a bandwidth, O is a starting resource block number and P is a length in terms of a number of resource blocks allocated.

2. The communication device according to claim 1, wherein the resource indication value is defined by one of the first expression and the second expression, based on a result of comparison between $P-1$ and a value based on $N/2$.

3. The communication device according to claim 2, wherein if $P-1$ is not greater than the value based on $N/2$, then the resource indication value is defined by $N(P-1)+O$, else the resource indication value is defined by $N(N-P+1)+(N-1-O)$.

4. The communication device according to claim 1, wherein the information indicating the resource indication value is represented by $\lceil \log_2(N(N+1)/2) \rceil$ bits.

5. The communication device according to claim 1, wherein the downlink control information comprises information for indicating a type of resource allocation.

6. A method in a communication device configured communicate with a communication node, the method comprising:
receiving, from the communication node, downlink control information comprising information indicating a resource indication value; and
interpreting the information indicating the resource indication based on the downlink control information,
wherein the resource indication value is defined by one of a first expression and a second expression,
wherein the first expression is $N(P-1)+O$,
wherein the second expression is $N(N-(P-1))+(N-1-O)$, and
wherein N is a number of resource blocks in a bandwidth, O is a starting resource block number and P is a length in terms of a number of resource blocks allocated.

7. The method according to claim 6, wherein the resource indication value is defined by one of the first expression and the second expression, based on a result of comparison between $P-1$ and a value based on $N/2$.

8. The method according to claim 7, wherein if $P-1$ is not greater than the value based on $N/2$, then the resource indication value is defined by $N(P-1)+O$, else the resource indication value is defined by $N(N-P+1)+(N-1-O)$.

9. The method according to claim 6, wherein the information indicating the resource indication value is represented by $\lceil \log_2(N(N+1)/2) \rceil$ bits.

10. The method according to claim 6, wherein the downlink control information comprises information for indicating a type of resource allocation.

11. A communication node configured to communicate with a communication device, the communication node comprising:
a transceiver and a controller, wherein the controller is configured to:
control the transceiver to transmit, to the communication device, downlink control information comprising information indicating a resource indication value,
wherein the resource indication value is defined by one of a first expression and a second expression,
wherein the first expression is $N(P-1)+O$,
wherein the second expression is $N(N-(P-1))+(N-1-O)$, and wherein N is a number of resource blocks in a bandwidth, O is a starting resource block number and P is a length in terms of a number of resource blocks allocated.

12. The communication node according to claim 11, wherein the resource indication value is defined by one of the first expression and the second expression, based on a result of comparison between P−1 and a value based on N/2.

13. The communication node according to claim 12, wherein if P−1 is not greater than the value based on N/2, then the resource indication value is defined by N(P−1)+O, else the resource indication value is defined by N(N−P+1)+(N−1−O).

14. The communication node according to claim 11, wherein the information indicating the resource indication value is represented by $\lceil \log_2(N(N+1)/2) \rceil$ bits.

15. The communication node according to claim 11, wherein the downlink control information comprises information for indicating a type of resource allocation.

16. A method in a communication node configured to communicate with a communication device, the method comprising:
transmitting, to the communication device downlink control information comprising information indicating a resource indication value,
wherein the resource indication value is defined by one of a first expression and a second expression,
wherein the first expression is N(P−1)+O,
wherein the second expression is N(N−(P−1))+(N−1−O), and
wherein N is a number of resource blocks in a bandwidth, O is a starting resource block number and P is a length in terms of a number of resource blocks allocated.

17. The method according to claim 16, wherein the resource indication value is defined by one of the first expression and the second expression, based on a result of comparison between P−1 and a value based on N/2.

18. The method according to claim 17, wherein if P−1 is not greater than the value based on N/2, then the resource indication value is defined by N(P−1)+O, else the resource indication value is defined by N(N−P+1)+(N−1−O).

19. The method according to claim 16, wherein the information indicating the resource indication value is represented by $\lceil \log_2(N(N+1)/2) \rceil$ bits.

20. The method according to claim 16, wherein the downlink control information comprises information for indicating a type of resource allocation.

* * * * *